Jan. 26, 1954 G. S. KRASNOV ET AL 2,667,211
SLIP COVER FOR UPHOLSTERED FURNITURE
Filed Nov. 8, 1948 8 Sheets-Sheet 1
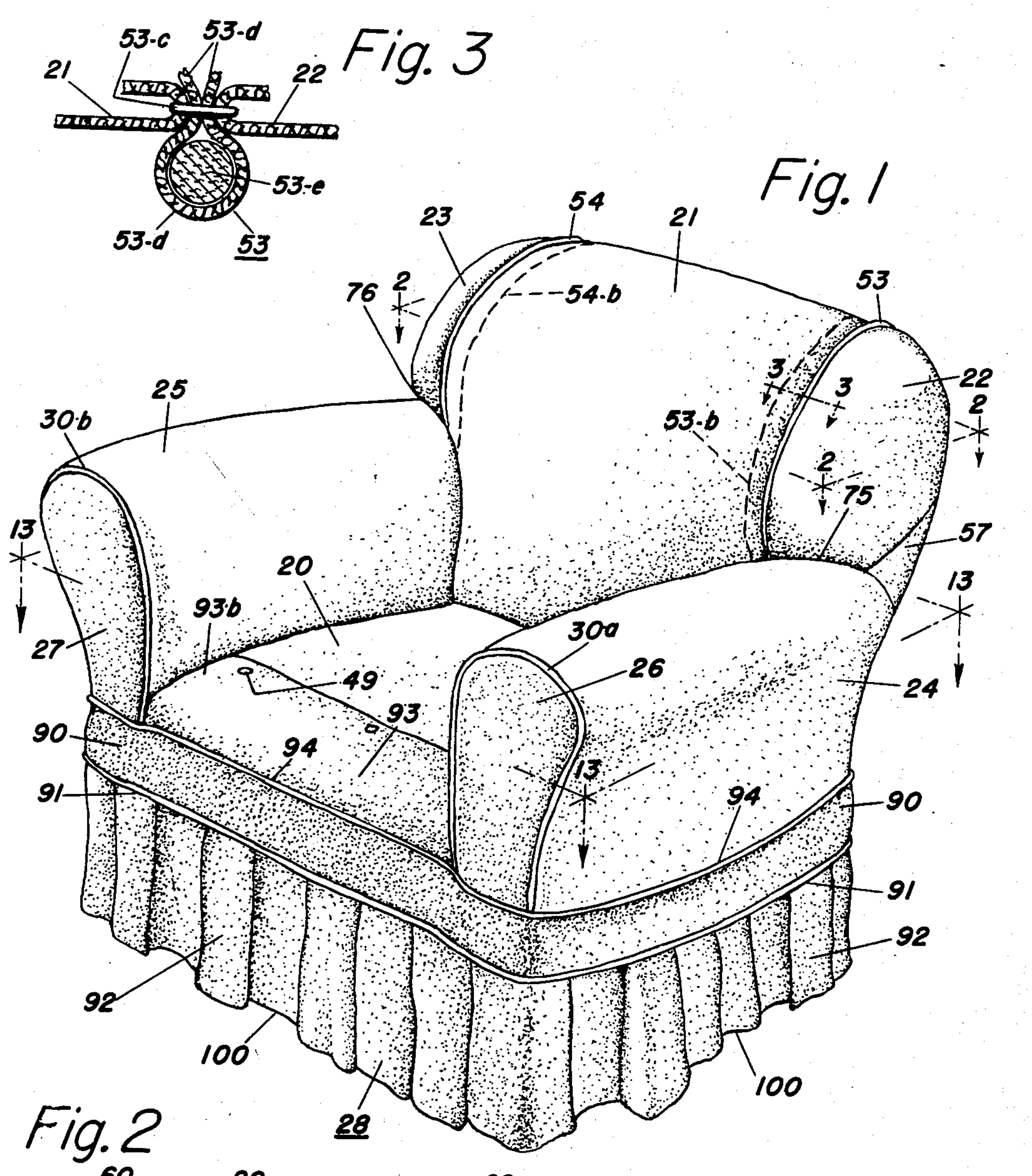
Fig. 3 Fig. 1 Fig. 2
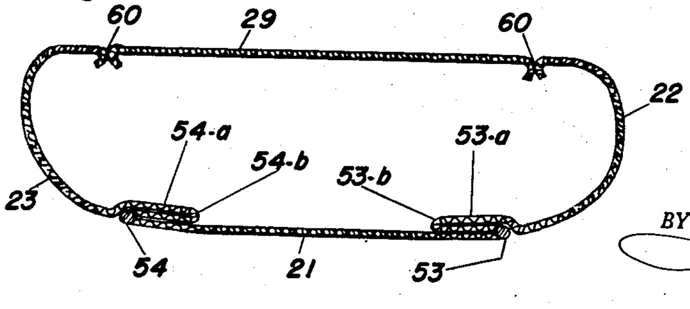
INVENTORS
George S. Krasnov
Norman I. Krasnov
BY Leonard L. Kalish
Attorney Jan. 26, 1954 G. S. KRASNOV ET AL 2,667,211

SLIP COVER FOR UPHOLSTERED FURNITURE

Filed Nov. 8, 1948 8 Sheets-Sheet 2

INVENTORS
George S. Krasnov
Norman I. Krasnov
BY Leonard L. Kalish
Attorney

Jan. 26, 1954 G. S. KRASNOV ET AL 2,667,211

SLIP COVER FOR UPHOLSTERED FURNITURE

Filed Nov. 8, 1948 8 Sheets-Sheet 3

INVENTORS
George S. Krasnov
Norman I. Krasnov
BY Leonard L. Kalish
Attorney

Jan. 26, 1954 G. S. KRASNOV ET AL 2,667,211

SLIP COVER FOR UPHOLSTERED FURNITURE

Filed Nov. 8, 1948 8 Sheets-Sheet 4

INVENTORS
George S. Krasnov
Norman I. Krasnov
BY Leonard L. Kalish
Attorney

INVENTORS
George S. Krasnov
Norman I. Krasnov
BY Leonard L. Kalish
Attorney

INVENTORS
George S. Krasnov
Norman I. Krasnov
BY Leonard L. Kalish
Attorney

SLIP COVER FOR UPHOLSTERED FURNITURE

Filed Nov. 8, 1948 8 Sheets-Sheet 7

INVENTORS
George S. Krasnov
Norman I. Krasnov
BY Leonard L. Kalish
Attorney

INVENTORS
George S. Krasnov
Norman I. Krasnov
By Leonard L. Kalish
Attorney

UNITED STATES PATENT OFFICE 2,667,211

SLIP COVER FOR UPHOLSTERED FURNITURE

George S. Krasnov and Norman I. Krasnov, Melrose Park, Pa.

Application November 8, 1948, Serial No. 58,952

8 Claims. (Cl. 155—182)

The present invention relates to ready-made slip-covers for upholstered furniture such as sofas, chairs or the like, and particularly to ready-made slip-covers composed partly of generally non-stretchable or non-elastic woven textile fabric panels, such as chintz or cretonne or the like, and partly of stretchable, or elastic tensioning or "breather" panels made of knitted or elastic materials.

An object of the present invention is a ready-made slip-cover for upholstered furniture, such as an upholstered chair or an upholstered sofa, or the like, formed mainly, or to a substantial extent, of woven and generally non-stretchable or non-elastic fabric, such as cretonne, and which may be readily applied to the furniture and which will fit the furniture piece snugly, smoothly and uniformly, notwithstanding variations in the dimensions of the furniture pieces, within a fair range of variations, so that one size of such ready-made slip-cover may be used for a number of different pieces of upholstered furniture of the same general type but varying in its several dimensions, and so that the slip-cover when applied, will remain neat upon the furniture piece while in use and not become baggy or wrinkled in spots after continued use and so that the slip-cover also may be more durable and not as readily subject to tearing, while in use.

Other objects of the present invention will appear more fully in the following description and accompanying drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

The ready-made slip-cover of our present invention is composed generally of a seat panel, arm-encasing portions or pockets to the left and to the right thereof, a back-encasing portion or pocket intermediate the two arm-encasing portions or pockets, with the outer side panels or portions of the arm-encasing pockets and the outer rear panel of the back-encasing portion or pocket being permanently joined to each other along some or all of their meeting edges from the bottom up to approximately the juncture of the top of the arm and back of the furniture piece, and disconnected from each other along the junction zone between the top and inner sides of the arms and the back of the furniture piece, but both being joined to the seat panel, with an excess of material along the slitted or free edges of both the arm-encasing pockets and the back-encasing pockets in the zone of the juncture between the top and inner sides of the arms and the back of the furniture, to be tucked therebetween for adjustment and for fitting the slip-cover to the chair.

The slip covers according to the present invention also have, in conjunction with the foregoing, generally form-retaining cord-welted seams between the two generally upright edges of the inner back-panel and the two adjoining shoulder panels; which seams extend generally parallel with each other towards the top and across the top of the back toward the outer back-panel; said form-retaining cord-welted seams being so arranged that the combined widths of the inner back-panel and shoulder-panels may be adjusted by forming a pleat of any excess material beneath the edge zones of the inner back-panel by tucking the excess of the width of the shoulder-panels beneath said form-retaining seams in the form of a pleat. The outer back-panel being of a stetchable material, having more or less elasticity (with or without rubber containing threads extending therethrough at intervals) serves to draw in and shirr the rear edges of the inner back-panel and of the shoulder panels, where they join the outer stretchable or elastic back-panel or breather panel, thereby retaining the aforesaid pleat beneath the form-retaining cord-welted edges of the inner back-panel.

Because of the construction of the present invention, the slip-cover also better conforms to the upholstered chair or sofa by reason of the disposition of the shoulder-panels between the sides of the main inner back-panel and the outer stretchable or elastic back-panel.

In one embodiment of the present invention, the outer back-panel, alone, is formed of stretchable or elastic material; either knitted fabric with or without rubber threads running therethrough at intervals, or a woven fabric with rubber threads running therethrough at suitable intervals. In another embodiment of the present invention, the outer back-panel, as well as the outer portions of the arm panels (which are generally permanently united with or connected with the outer back-panel) are formed of similar stretchable or elastic material; and the front arm panels may also be formed of the same material, as may the seat-panel also be formed of the same stretchable or elastic material.

The embodiment in which only the outer back-panel is formed of stretchable or elastic material, is illustrated generally in Figures 1 to 6 inclusive of the drawings, while the form in which the side-panels, front and seat-panels are also formed of the stretchable or elastic material, is indicated generally in Figure 7, although some of the other figures are generally applicable to this form of construction as well.

In the accompanying drawings, in which like reference characters indicate like parts, Figure 1 represents a front perspective view, taken at an angle, of one embodiment of the ready-made slip-cover of the present invention, applied to an upholstered club-type chair.

Figure 2 represents a horizontal cross-sectional view on line 2—2 of Figure 1.

Figure 3 represents a fragmentary cross-sectional view on line 3—3 of Figure 1, with the pleat eliminated, by pulling out the pleat-fabric, and shown on a much enlarged scale.

Figue 7 represents a perspective view similar to that shown in Figure 1 of another (or modified) embodiment of the present invention, with the skirt-portion thereof omitted or removed.

Figures 6, 7, 8:
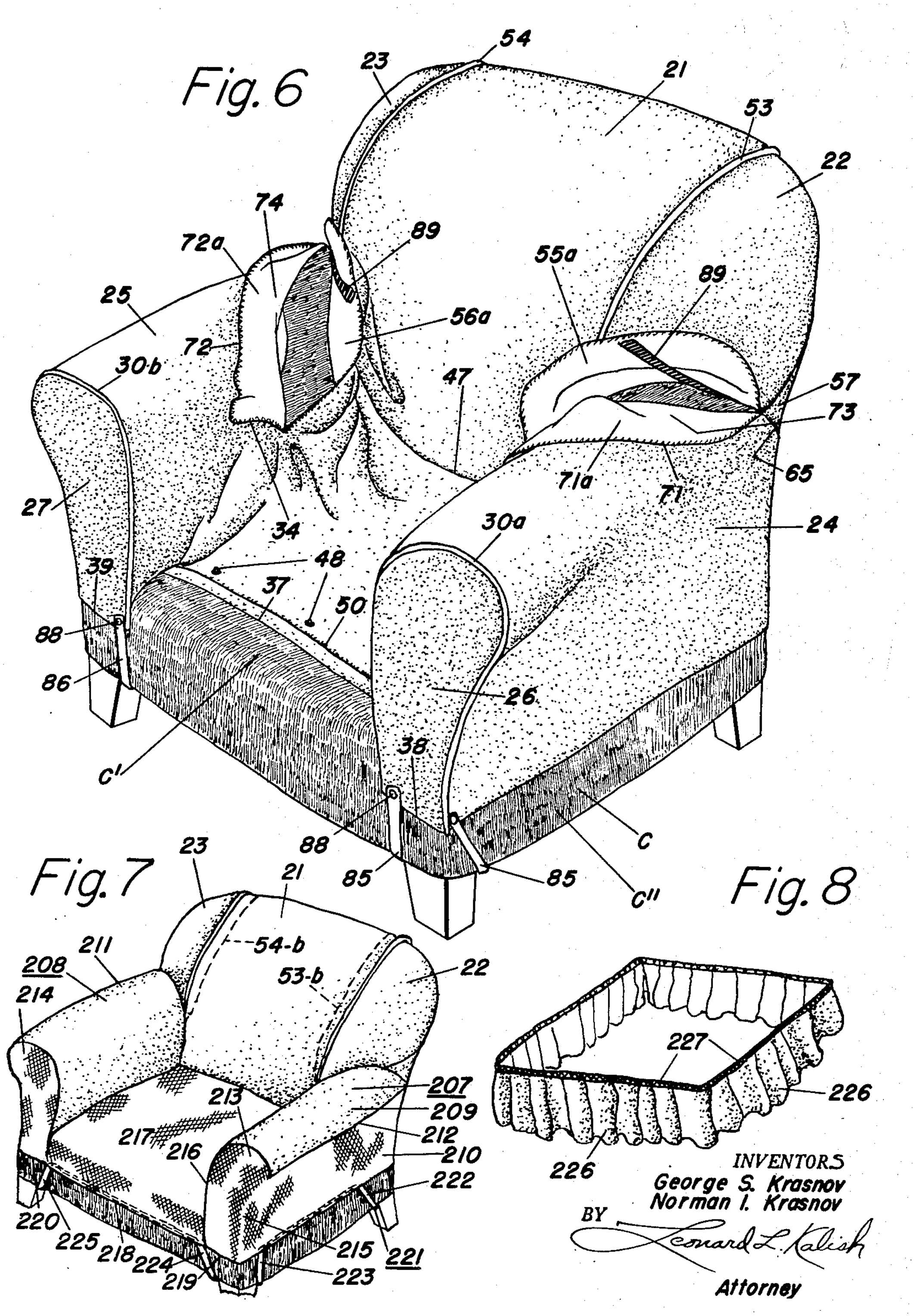
Figure 6 represents a perspective view of the same embodiment of the present invention as is shown in Figures 1, 4 and 5 but with the skirt portion detached and with the slip-cover not yet fully applied or "in position" on the furniture piece, namely, in the juncture-zones between arms and back, thereby showing the slitted construction of the slip-cover in these zones.

Figure 8 represents a perspective view of the skirt portion of the embodiment of the invention shown in Figure 7, although the skirt construction shown in this figure may also be used with and as a part of the embodiment shown in Figures 1, 4, 5 and 6, with a forward lengthening of the seat-panel thereof.

Figure 9:
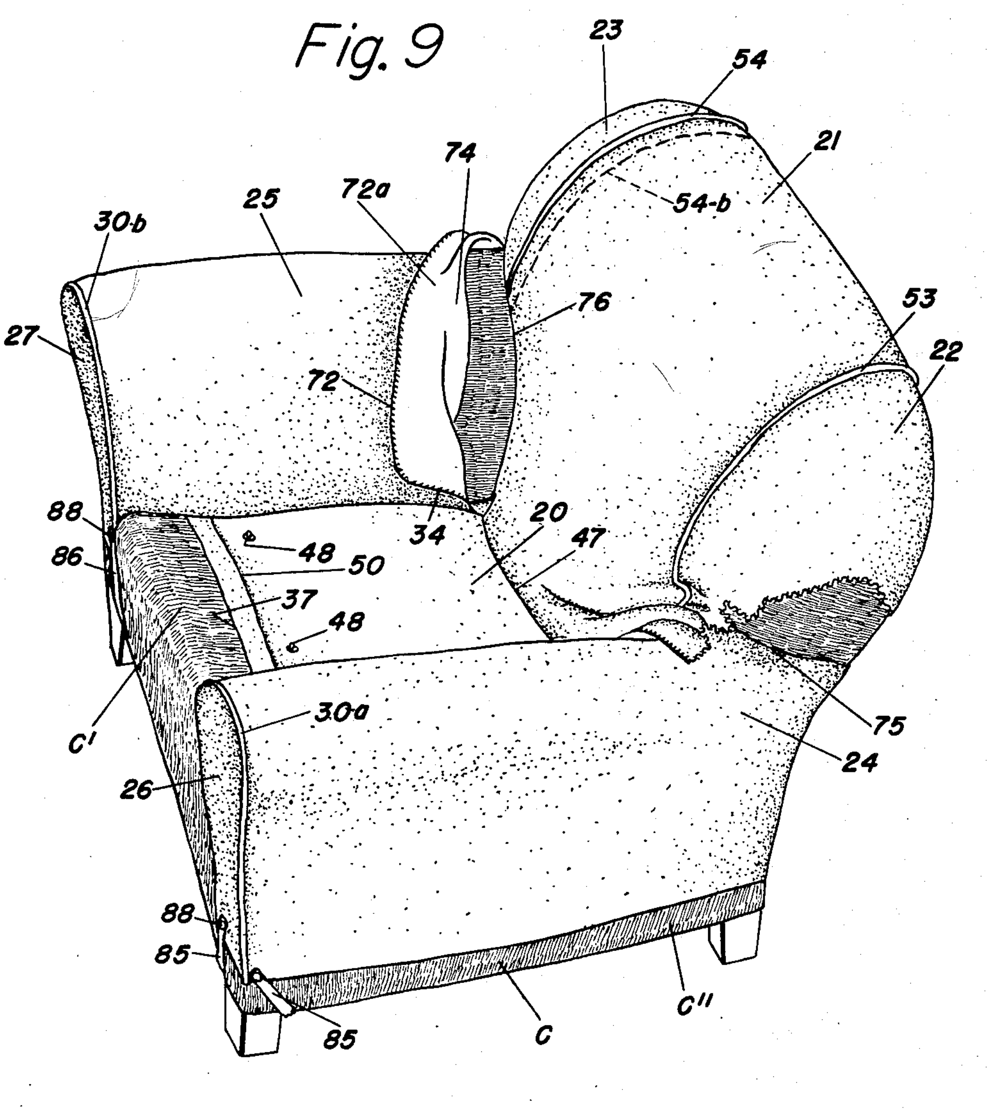

Figure 9 represents a perspective view of the embodiment shown in Figures 1, 4, 5 and 6, with the slitted zone of the inner back-panel tucked in between the back and the right arm but with the corresponding slitted arm-portion of the slip-cover not yet similarly tucked in, and with the slitted zone of the inner back-panel adjoining the left arm being not tucked in while the corresponding slitted arm-portion is tucked in between the back and the left arm.

Figure 10:
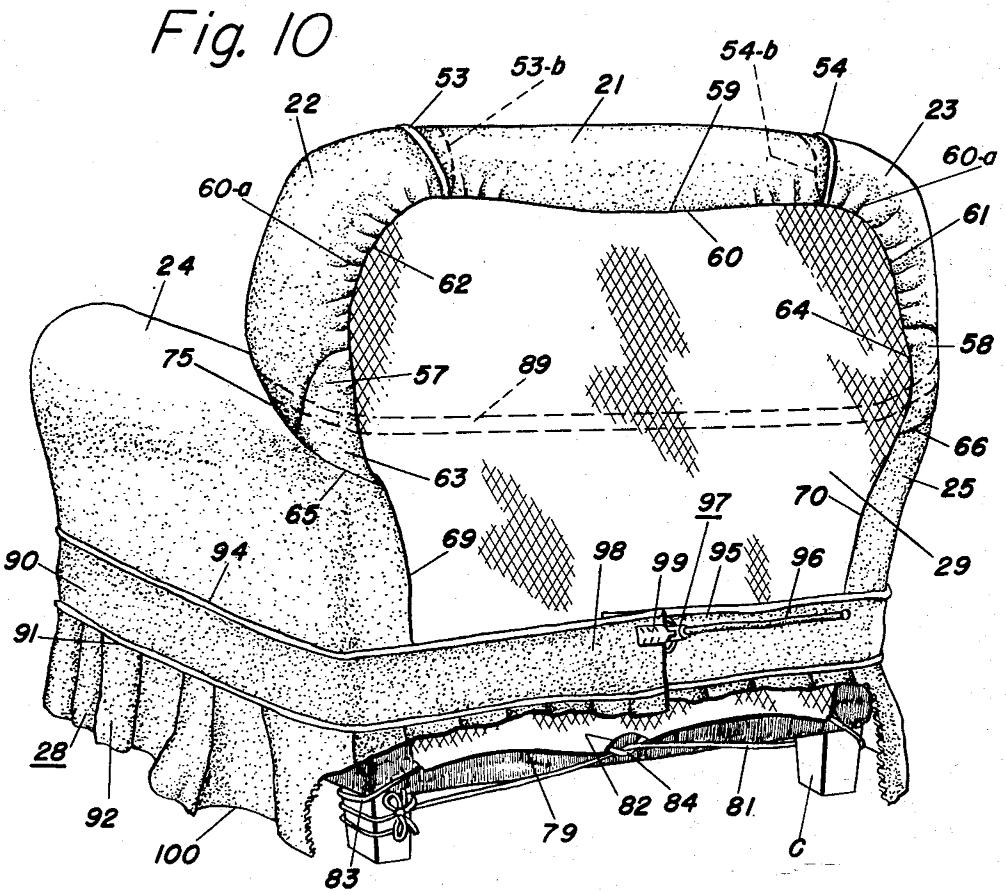

Figure 10 represents a rear perspective view of the embodiment shown in Figures 1 to 6 inclusive, and in Figure 9, showing the arrangement of the rear "breather" panel and the relationship and attachment of the skirt at the rear.

Figures 4, 5:
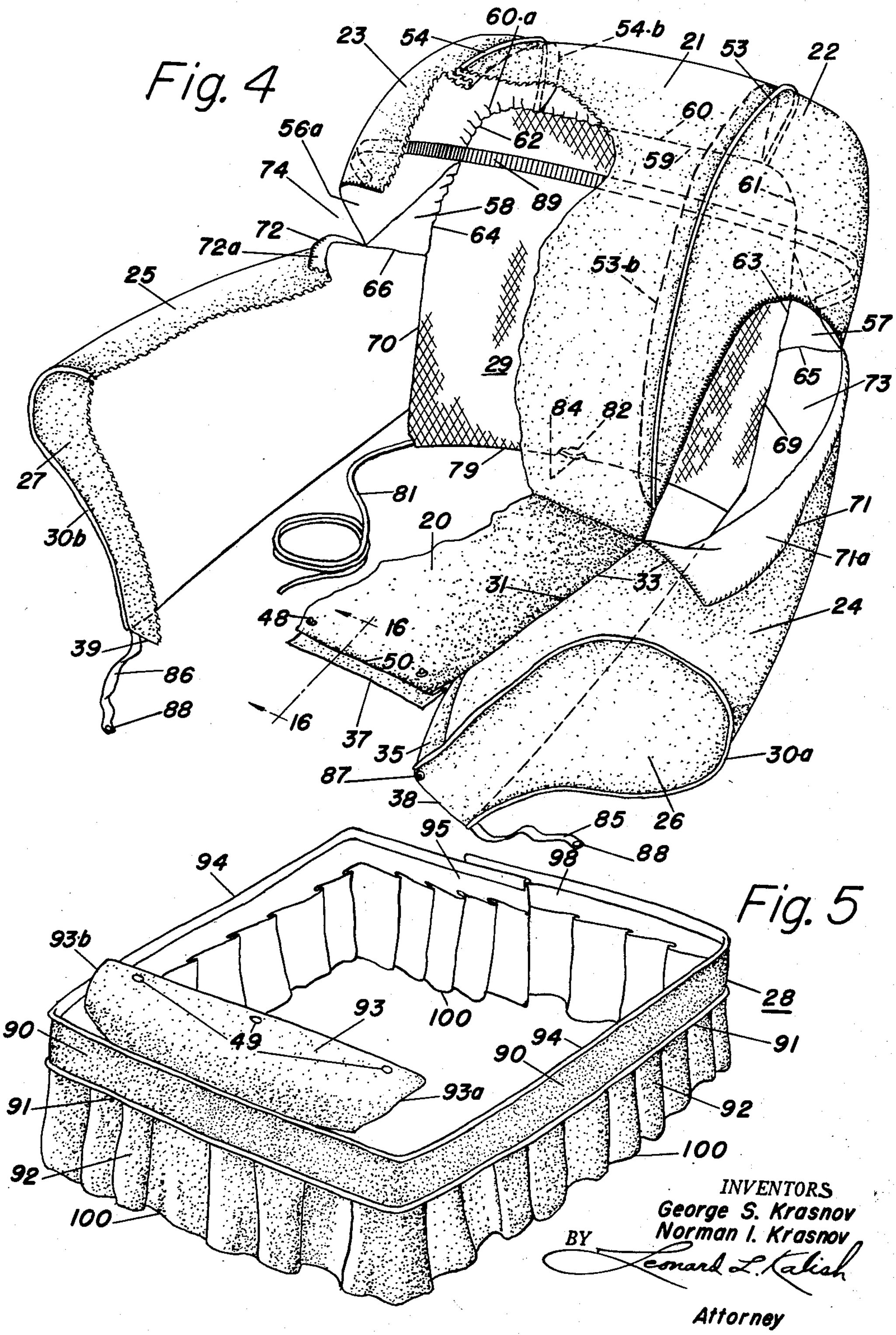
Figure 4 represents a similar perspective view of the main or body portion of the same embodiment of the ready-made slip-cover of the present invention, with parts broken away so as to reveal more clearly some of the features of this construction.
Figure 5 represents a front perspective view of the skirt-portion of a slip-cover shown in Figure 1, embodying one form of the present invention.
Figures 11, 12:
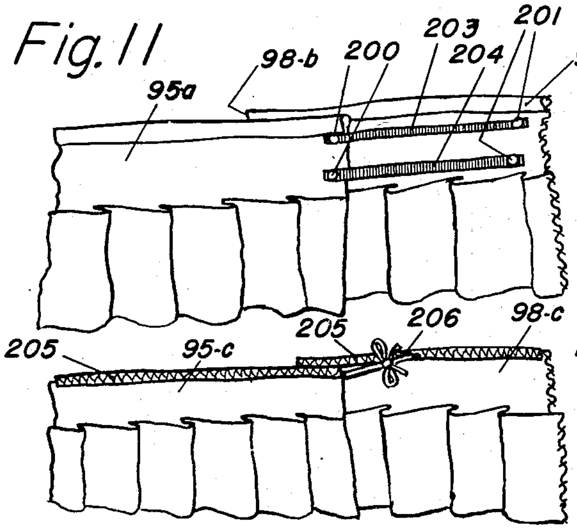

Figure 11 represents a fragmentary perspective view, from the inside, of the skirt of the general type shown in Figure 5, showing a modified form of tensioning construction, in the rear thereof.

Figure 12 represents a fragmentary perspective view, from the inside, of the skirt of the general type shown in Figure 5, showing still another modified form of tensioning construction, in the rear thereof.

Figure 13:
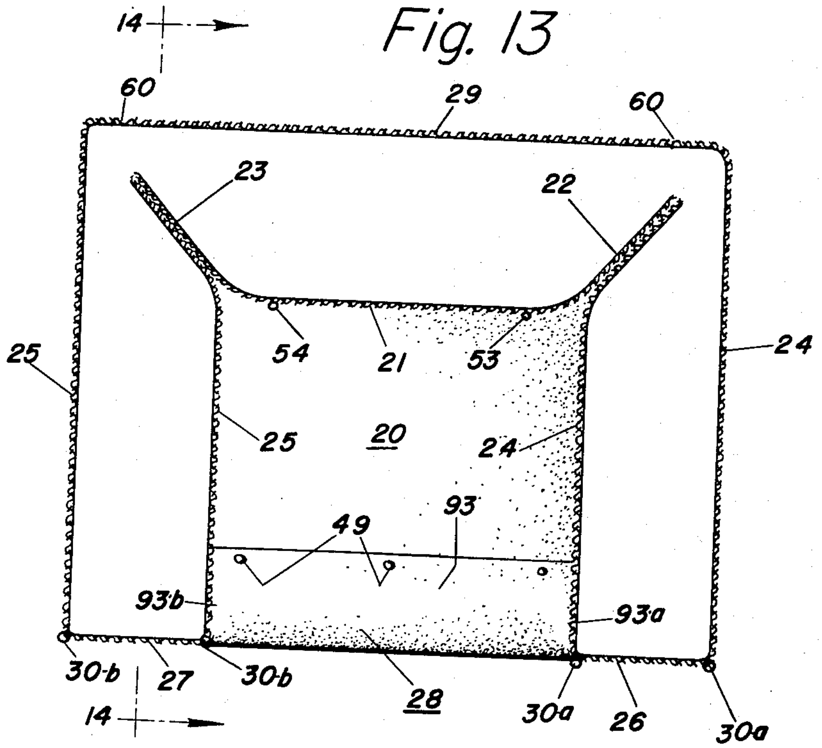

Figure 13 represents a horizontal cross-sectional view taken generally on line 13—13 of Figure 1.

Figure 14:
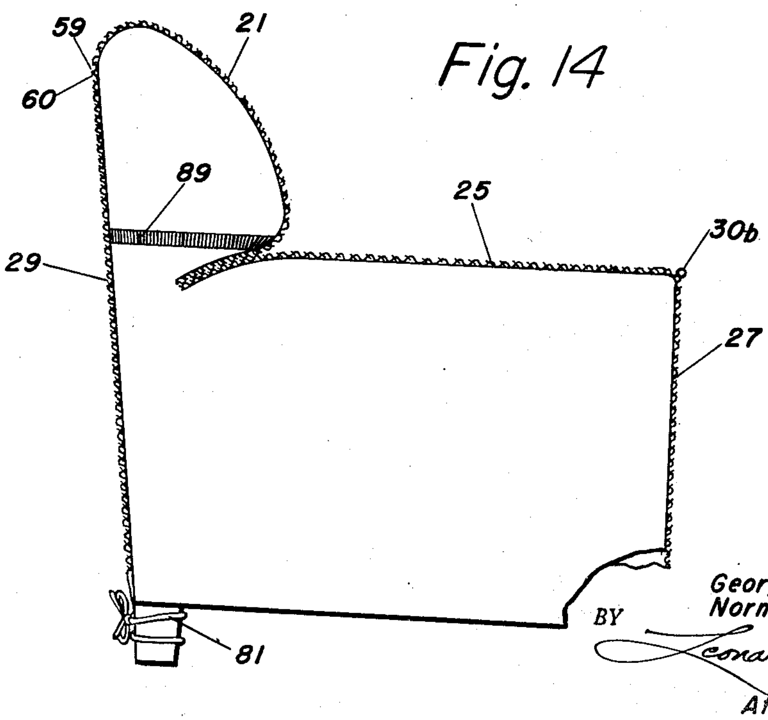

Figure 14 represents a vertical section on line 14—14 of Figure 13.

Figures 15, 16, 17:
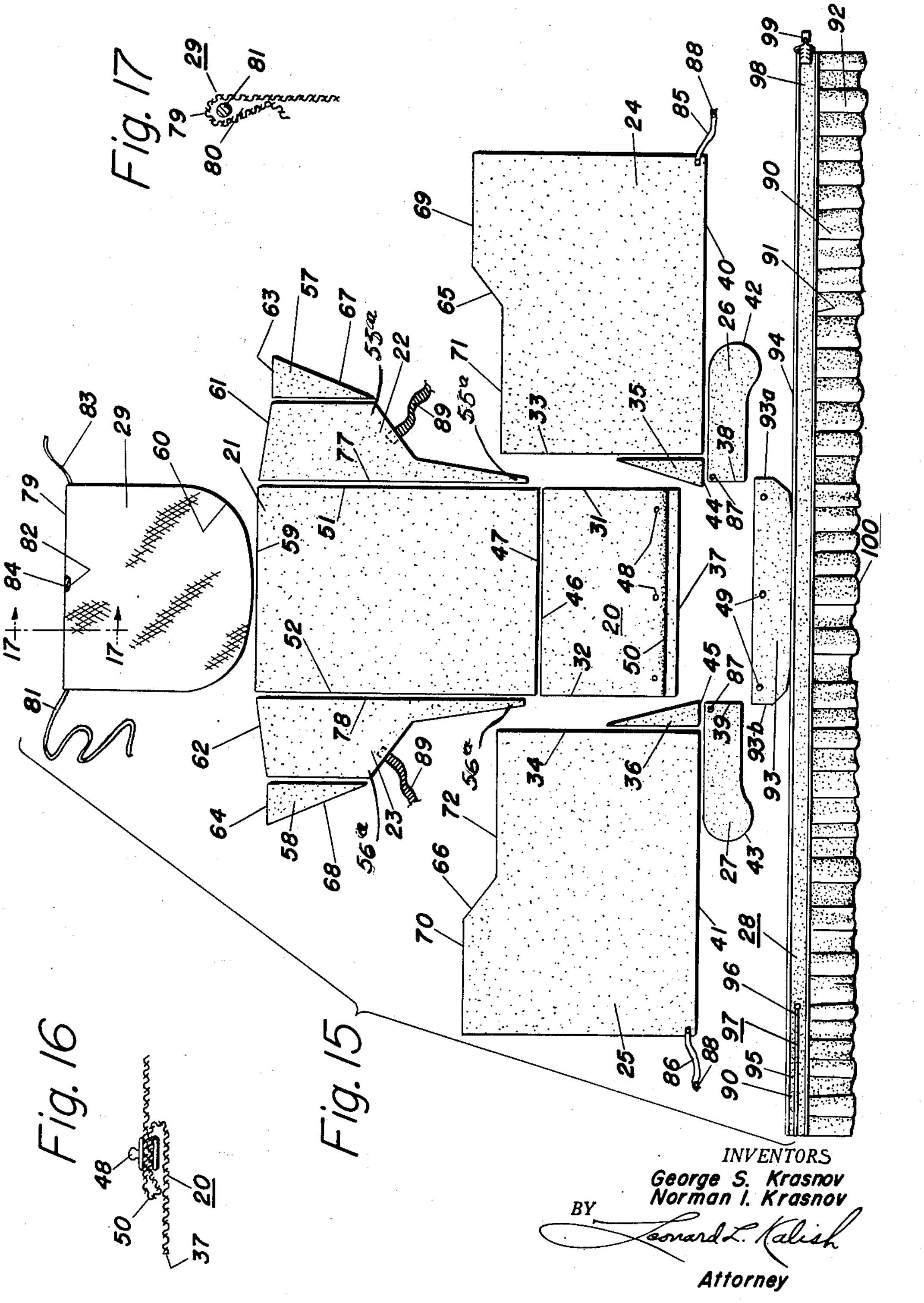

Figure 15 represents a plan view of the component parts of the slip-cover of the present invention, showing the development or layout of these component parts, prior to the assembly thereof.

Figure 16 represents a section on line 16—16 of Figure 4.

Figure 17 represents a section on line 17—17 of Figure 15.

Figure 18:
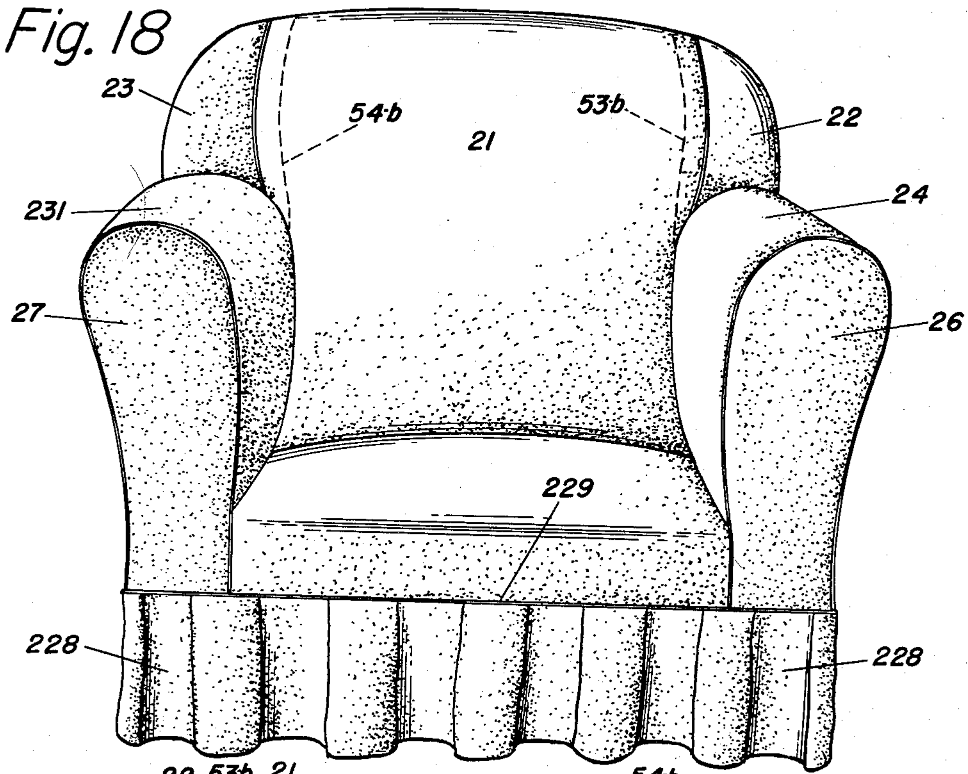

Figure 18 represents a front perspective view of another embodiment of the present invention, namely, in which the skirt is attached to the front, side and back panels, and in which the skirt, and a part of the juncture of back panel with side panel, may be opened and closed by a fastener device such as a slide-fastener.

Figure 19:
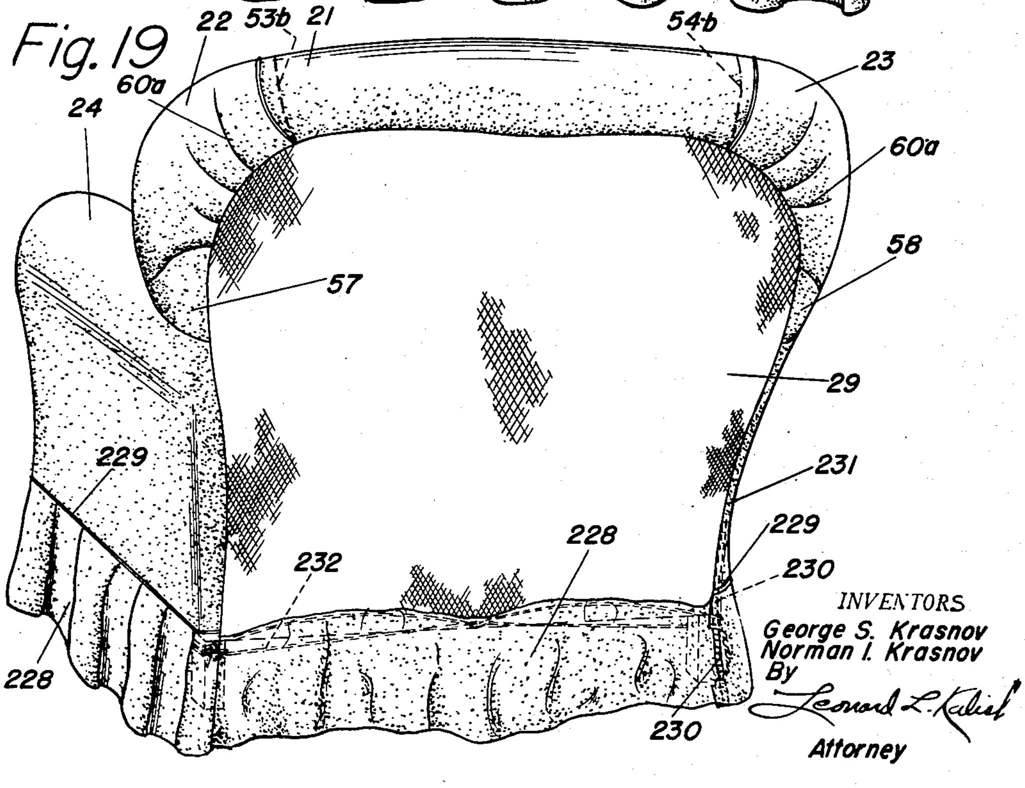

Figure 19 represents a rear perspective view of the embodiment shown in Figure 18.

As shown in Figures 1, 4, 5, 6, 9 and 15, our slip-cover includes a seat panel 20, an inner back-panel 21, left and right shoulder panels 22 and 23, left and right arm panels 24 and 25, left and right front arm panels 26 and 27 and a detachable skirt-assembly 28 composed of non-stretchable non-elastic material such as cretonne or chintz or the like. An outer rear-back-panel 29 may consist of a stretchable, tensioning or "breather" panel composed of elastic or knitted material and concealed behind the back of the piece of furniture, yet adapted to draw the aforesaid non-elastic panels closely about the upholstered piece of furniture upon which they are to fit.

With particular reference to Figures 4, 6, 9 and 15, it can be seen that the left and right arm panels 24 and 25 are attached along edges 40 and 41 to the edges 42 and 43 of the left and right front arm panels 26 and 27 by a pair of welted seams 30-*a* and 30-*b*, respectively. This construction provides an open pocket-like arm-encasing portion adapted to envelop the top and sides of the arms of the chair or sofa. Although the description and drawings herein are applied to a club-type chair, the principles of our invention will adapt the slip-cover, embodying the present invention, so as protectively to envelop upholstered furniture of various shapes and sizes, in the manner and with the advantages hereinabove set forth.

The seat panel 20 is shorter, in length, than the arm panels 24 and 25, and is fastened along its edges 31 and 32 to the inner edges 33 and 34, respectively, of the arm-panels 24 and 25 to extend near the rear thereof but spaced slightly forward of the juncture of the edges 33—71 and 34—72, respectively. This causes the front edge 37 to lie across the seat of the chair C considerably to the rear of the front edge of the chair-seat.

Generally triangular-shaped pieces of fabric 35 and 36 may be inserted, at the front end of seat-panel 20, between edges 31 and 33 and between edges 32 and 34. These triangular pieces 35 and 36 allow the lower edges 38 and 39 of the front arm-panels 26 and 27, respectively, to be drawn below the general level of the seat of the chair so that the lower edges of the body portion of the slip cover will be below the upper edge of the skirt-assembly, hereinafter to be described. Thus, the length of cord-welted edge 42 of the front arm-panel 26 may correspond to the length of the cord-welted edge 40 of the left arm-panel 24, plus the length of edge 44 of the triangular wedge 35. Likewise, the length of the cord-welted edge 43 of the front arm-panel 27 corresponds to the sum of the lengths of the cord-welted edge 41 of the right arm-panel 25, plus the edge 45 of the wedge piece 36.

The inner back-panel 21 is attached to the rear edge 46 of the seat-panel 20 at its lower edge 47.

Spaced a distance inward from the edge 37 of the seat-panel 20, is a row of male snap-fastened members 48, or the like, which are adapted to coact with the corresponding female snap-fastener members 49 attached to the pleated skirt 28, in a manner hereinafter described.

As is shown in Figure 16, the male snap-fastener members 48 may be attached to the panel 20, along a folded edge 50 therein. This fold provides a double thickness of material to support the male snap-fastener members 48, thereby insuring against the tearing out of said snap-fastener members 48 from the seat-panel 20.

In one form of the present invention, the inner surface of the back of the chair is covered, for the most part, by the inner back-panel 21. Shoulder-panels 22 and 23 are attached to the left and right vertical edges 51 and 52, respectively, of the inner back-panel 21, by a pair of cord-welted seams or "piping" 53 and 54. A cross-section of the cord-welted seam 53 is shown on a greatly enlarged scale in Figure 3. Thus, a generally non-stretchable and form-retaining cord 53–*e* may be covered with a woven fabric 53–*d* of a harmonizing or contrasting color to form a form-retaining "piping" or cord-welt similar to the cord-welted seams 30–*a* and 30–*b* hereinabove referred to. The shoulder-panel 22 and the inner back-panel 21 may then be sewed as by a row of stitching 53–*c*, (or otherwise fastened) to the cord-covering or "piping" 53–*d*.

Triangularly-shaped panels 57 and 58 are provided at the rearmost corner of the panels 22 and 23, respectively. These triangular extensions 57 and 58 permit the shoulder-panels 22 and 23 to be shirred along their juncture with the rear "breather"-panel and more closely to encompass the sides of the back of the piece of furniture with a minimum of wrinkling or bulging. Thus, the inner back-panel 21. and the shoulder-panels 22 and 23, closely conform to the contour of the piece of furniture when the slip-cover is in place.

The inner back-panel 21 is fastened, at its upper edge 59, to the stretchable outer back-panel or "breather"-panel 29, along the upper portion of the edge 60 thereof. In like manner, the edges 61 and 62 of panels 22 and 23, respectively, and the edges 63 and 64 of the triangular panels 57 and 58, respectively, are also permanently sewed to the edge 60 of the outer back-panel 29. The edges 59, 61, 62, 63 and 64 are sewed to the edge 60 of the outer stretchable or elastic back-panel 29 with shirring, pleats or tucks 60–*a* along their juncture lines or edges, so that the combination of panels 21, 22, 23, 57, 58 and 29 form an open pocket-like back-encasing member which envelops the back of the piece of furniture upon which the slip-cover is placed, and all of the back-panel or "breather"-panel 29 is concealed behind the back of the piece of furniture. This is best shown in Figure 4.

As shown particularly in Figure 4, the edges 65 and 66 of the outer portions of the arm-panels 24 and 25, respectively, are permanently united with the edges 67 and 68 of the triangular panels 57 and 58, respectively. In addition, the edges 69 and 70 of the outer portions of the arm-panels 24 and 25, respectively, are permanently united with the lowermost portions of the outer back-panel or "breather"-panel 29.

Although the edge 69 or the edge 70 of the outer portions of the arm-panels 24 and 25 are shown, in Figure 10, as being permanently united with the lower ends of edge 60 of the outer back-panel or "breather"-panel 29, a slide-fastener or other quickly attachable-detachable connection, such as snap-fasteners or buttons or the like, may be employed along a portion of these seams 69 and 70, whereby these edges may be temporarily detached from the outer back-panel 29, thereby to enable the main body portion of the slip-cover to be drawn more easily into place over the back of the piece of furniture. This alternate construction is similar to that shown in Figure 19.

As shown in Figures 4, 6 and 9, the edges 71 and 72 of the inner portion of the arm-panels 24 and 25, respectively, are not attached to the inner-back-panel 21, nor to the shoulder-panels 22 or 23. This provides a gap 73, between the left arm-encasing portion and the back-encasing portions, and a gap 74, between the right arm-encasing portion and the back-encasing portion.

With the main body portion of the slip-cover loosely drawn into place over the chair C, as shown particularly in Figure 6, the gaps 73 and 74 appear at the juncture between the arms and the back of the chair C. Because the seat-panel 20 is wider than is necessary to cover the chair-seat, it is possible to tuck the edges 31, 32 and 46, of the seat-panel 20, into the space between the seat C' and the arms and back of the chair C, as is shown particularly in Figures 1, 6 and 9. The edges 33 and 34, of the inner portion of the left and right arm-panels 24 and 25 respectively, are generally longer than the exposed surface of the arms of chair C. This provides edge portions 71–*a* and 72–*a* of the arm panels 24 and 25 loosely draped over the rear of the arms, after the remainder of the arm-panels have been drawn into place. The edge portions 71–*a* and 72–*a* provide additional material which can be used to cover the arms, if the length of the arms of the chair are longer. In an average size chair, or in a chair in which the arms are shorter than normal, these edge portions 71–*a* and 72–*a* can be tucked into the gaps 75 and 76, between the rear of the arms and the back of the chair C to a greater extent than if the arms are longer. As is shown particularly at 75 in Figures 9 and 13, the edge portion 71–*a* fits neatly into the gap 75, and the exposed surface of the arm-panel 24 is smooth and fits snugly over the arm of the chair C. In like manner, the edge portion 72–*a* can be tucked into the gap 76 between the right arm and the back of the chair C, so that the arm panels will have the smooth appearance so desirable in a well-fitting slip-cover.

In a manner similar to that described in the preceding paragraph edge portions 55–*a* and 56–*a*, of the shoulder-panels 22 and 23, respectively, also can be tucked into the gaps 75 and 76 between the arms and the back of the chair, as is shown particularly in Figures 6, 9, 13 and 14. Thus, the inner back-panel 21 and the shoulder-panels 22 and 23 smoothly cover the front and side surfaces of the back of the chair C.

The gaps 73 and 74 in the slip-cover permit independent adjustment of the arm-panels 24 and 25, and of the shoulder-panels 22 and 23.

If the width across the back of the chair is smaller, the panels 21, 22 and 23 at first do not lie smoothly thereagainst, and then the inner edges 77 and 78 of the shoulder-panels 22 and 23 are tucked beneath the form-retaining cord-welted seams 53 and 54, in a manner indicated in Figure 2. Thus, the material of the shoulder-panels 22 and 23, adjacent the cord-welted seams 53 and 54 may be tucked beneath the inner back-panel 21 so as to form pleats 53-*a* and 54-*a* therein, defined by the form-retaining cord-welted seams 53 and 54. The edges 53-*b* and 54-*b* are shown by dotted lines in Figures 1, 4, 7, 9, 10, 18 and 19. These pleats 53-*a* and 64-*a* permit the shoulder-panels 22 and 23 closely to envelop the sides of the back of the chair and eliminate any wrinkles or creases from the unstretchable woven fabric panels 21, 22 and 23. The non-stretchable cord-welted seams 53 and 54 also act as stabilizers to hold the shoulder-panels 22 and 23 in place against the back of the chair and prevent the pleats 53-*a* and 54-*a* from being pulled out and distorted when the chair is occupied and tension placed against the non-stretchable panels 20, 21, 22 and 23, and also to minimize lateral shifting or dislocation of the panels 21, 22 and 23.

As shown particularly in Figure 10, the upper extremities of panels 21, 22 and 23, extend over the crown and sides of the back of the chair, and terminate behind the back of the chair.

Shirring, pleats or tucks 60-*a* formed in edges 59, 61, 62, 63 and 64, at the points of attachment to edge 60 of the outer back-panel 29, provide an expansible and contractible box-like envelope which fits closely about the back and shoulders of said chair C.

The outer back-panel 29 may consist of a knitted material which has an inherent stretchability and contractibility. Thus panel 29 can expand or "breathe" when stresses are exerted on the other non-stretchable woven panels. Moreover, panel 29 may have knitted into its material, some elastic cords, strands or yarns which increase the effective tensioning qualities of the back-panel 29.

The back-panel 29 may also be a woven fabric with rubber or similar elastic or contractible strands or yarns (such as "Lastex" yarn) woven into it, at intervals, weft-wise and/or warp-wise, said strands or yarns being disposed horizontally and/or vertically in the panel 29 (or on a bias). Likewise, panel 29 may be composed entirely of an elastic or rubber-like sheet.

"Breather" panels above referred to are shown generally in Krasnow Patents 2,286,171 and 2,266,678. The material of these "breather" panels may be knitted of non-elastic yarns, or may contain stretchable yarns, as shown in Krasnov Patents 2,350,359 and 2,429,187.

The lower edge 79 of the outer back-panel 29 may be turned back and sewed upon itself, for the greater portion thereof, so as to form a tunnel 80 therein, as shown in Figure 17. A cord 81 is threaded through this tunnel 80, and is exposed at a gap 82, midway along the tunnel 80, and also at the ends thereof, as shown in Figures 4, 10 and 15. This cord 81 holds the lower edge 79 of the outer back-panel 29 tightly adjacent the lower edge of the back of the chair C (as shown particularly in Figure 10). One end 83 of the cord 81 may be passed around a rear leg of the chair C. At the point where the cord 81 leaves the other end of the tunnel 80, the cord 81 may be passed around the other rear leg of the chair C, then directed back toward the middle of the edge 79, through the loop 84 at the gap 82, and then around the first-mentioned rear leg of the chair C, finally engaging the first end 83 of the cord 81.

The lower edges 38 and 39 of the front arm-panels 26 and 27 are secured, as shown in Figures 4 and 6, by elastic cords 85 and 86, which may carry snap-fastener elements 88 at the ends thereof. These snap-fastener elements may engage complementary snap-fastener elements 87 attached near the lower edges 38 and 39 of the front arm-panels 26 and 27, or near the edges of the outer portions of arm-panels 24 and 25. As is shown particularly in Figure 6, these cords 85 and 86 may be passed beneath the chair C and behind the front legs, so as downwardly to tension the front arm-panels 26 and 27, and also the outer portions of the arm-panels 24 and 25. The elastic cords constantly tension the front arm-panels in a downward direction, but will readily "give" or expand when any undue stress is placed against the said front arm-panels in an upward direction.

In addition to the elastic-containing knitted or woven panel 29, we may employ an elastic band 89 attached to the inner back-panel 21 or preferably to the shoulder-panels 22 and 23 at about the level of the top of the arms. This elastic band 89 passes around the rear of the back of the chair C (as shown particularly in Figures 4 and 10) to tension the shoulder-panels 22 and 23 horizontally, and insure a snug and smooth fit of the aforesaid panels over the back of the chair C.

After the main body portion of the slip-cover has been applied to the chair C, the lower edge of the chair C'' will be left exposed. So as to cover the exposed surface C'' and also the legs of the chair C, we provide a detachable skirt-assembly 28, referred to hereinabove.

The detachable skirt-assembly 28 consists of a band 90, to which is attached, as by a welted seam 91, a pleated member 92. In addition, a panel 93 is attached to the band 90 (near the midpoint thereof) along the upper edge 94. This panel 93 carries a plurality of female snap-fastener elements 49, referred to above, adapted to engage and co-act with the male snap-fastener elements 48 on the seat-panel 20, hereinabove referred to.

The panel 93 is wide enough to extend completely across the width of the seat of the chair and its ends can be tucked into the space between the arms and seat. Moreover, panel 93 is long enough to extend beyond edge 37 of panel 20, and permit snap-fastener elements 49 to co-act with elements 48. Thus, there is no gap or unsightly joinder of seat panel and skirt-portion exposed to view at the front of the chair.

At one end 95 of the band 90, we provide a tape-member 96 of a slide-fastener 97, of the general type illustrated in Statham Patents 1,838,463; 1,887,825 and 1,887,826. At the other end 98 of the band 90, a cooperating element 99 of the slide-fastener 97 is attached.

When in the asembled position, as shown particularly in Figure 10, these two elements 96 and 99 of the slide-fastener 97 may cooperate so that the ends 95 and 98 of the band 90 can be drawn together.

Although we prefer to use the slide-fastener described hereinabove, we do not mean to limit ourselves to such means for fastening the edges 95 and 98, but could use any attachable-detachable element such as snap-fasteners, hooks and eyes, buttons, clips or the like, to make adjustable connection between the ends 95 and 98.

Thus, as shown in Figure 11, we may employ elastic straps 203 having snap-fastener elements 200 and 201 attached to the ends thereof. Co-operating snap-fastener elements are affixed to ends 95–*a* and 98–*a* of band 90, which may co-act with elements 200 and 201. After the ends of the band 90 have been passed around the sides and back of the chair into registration with each other, the snap-fastener elements 200 and 201 may be affixed to the band, and the straps 203 and 204 then pull the band 90 tightly around the base of the chair. The free end 98–*b* may be pinned or otherwise fastened to the end 95–*a*.

With reference to Figure 12, we show a modified form of a skirt 28, wherein the edge 94 has sewed thereto an elastic strap 205. This strap 205 tightly holds the upper edge of the band 90 above the lower edge of the body portion of the slip-cover. In this modification, shown in Figure 12, a pair of tie-cords, 206 and 207, are sewed to the edge 94 near the ends 95–*c* and 98–*c*. These tie-cords 206 and 207 are pulled together so as to stretch the elastic strap 205. The skirt 28 is thus pulled tightly about the chair and held in place by the tensioned elastic 205.

After the seat-panel 20 and the arm-panels 24 and 25 have been smoothed into place, as shown particularly in Figure 9, the panel 93 may be placed across the front edge of the seat C′ of the chair C, so that the femal snap-fastener elements 49 engage the male snap-fastener elements 48 on the seat-panel 20, as is shown particularly in Figure 1. The ends 93–*a* and 93–*b* may then be tucked into the gap between the seat C′ and the arms of the chair C. In addition, the seat panel 20 may be adjusted forward or backward by either tucking in or releasing some of the material from the gap of the chair along the edge 46. This adjustment of the seat-panel 20, will bring the lower edge 100 of the pleated panel 92 into proper registration with the lower edge of the chair C. The ends 95 and 98 then are passed around the sides and the back of the chair C, and the slide-fastener elements 96 and 99 may be fastened together. Thereafter, the slide-fastener 97 may be adjusted until the band 90 is pulled tightly around all sides of the chair C, at the proper level.

The skirt 28 also holds the outer portions of the arm-panels 24 and 25 tightly against the sides of the arms of the chair, so as to prevent any unsightly bulging. Moreover, the skirt 28 neatly and effectively conceals the lower edge of the outer stretchable back-panel 29, and the fastening cord 81 associated therewith.

With reference now to that modification of the present invention shown in Figures 7 and 8, there is shown a slip-cover constructed generally like that disclosed in Figures 1, 4, 6, 9, 10 and 15, but modified slightly, as follows:

The left and right arm-panels 207 and 208 are generally the same as the left and right arm-panels 24 and 25, hereinbefore described, but in this modification, are composed of two separate portions. Thus, the left arm 207 may consist of a woven textile panel 209 and a stretchable "breather" panel 210. Likewise, the right arm-panel 208 also consists of a woven textile panel 211 and a stretchable "breather" panel similar to panel 210. As is shown particularly in Figure 7, the panels 209 and 210 are joined along a seam 212, which appears on the outside of the left arm of the chair, somewhat below the crown of said arm. Thus, the upper portion and the inner portion of each arm is protected by a cretonne or chintz (or similar woven fabric) panel, while the lower outer portion of the arm panels are held tightly against the side of the chair by the stretchable "breather" panels.

Likewise, the front arm-panels 26 and 27 heretofore described, may be constructed of a stretchable or elastic material, similar to the panel 210 and to the panel 29. In the embodiment shown in Figure 7, the front of the arms of the chair are covered by panels 213 and 214 which are extensions of the lower outer knitted arm-panel portions (such as panel 210). Thus, panel 210 continues around the front corner 215, of the left arm as at 213, and covers the front of the left arm. The portion 213 of the knitted panel 210 may be sewed to the arm-panel 209 along the seam 216.

The knitted portions 210, 213 and 214 (and the right arm portion corresponding to panel 210) draw the woven textile panels 209 and 211 closely about the arm of the chair.

With further reference to Figure 7, it is shown that the seat-panel 217 also may be constructed of a knitted or elastic material in place of the woven textile panel 20 hereinabove described. In this embodiment, the front edge 218 of the seat-panel 217 extends over the front edge of the seat of the chair and terminates in a line generally co-extensive with the lower edges 219 and 220 of the front arm-panels 213 and 214.

The slip-cover in the embodiment shown in Figure 7 includes, along the edge 218 of the seat portion 217, and along the lower edges of the outer knitted portions 210 (and the corresponding portion of the outer side of the right arm of the chair), a turned-back end which provides a tunnel along each of these edges, similar to the tunnel 80 hereinabove described in connection with the rear back-panel 29. The tunnels along the edge 218 and along the lower edge of the knitted outer arm panels terminate short of the corners of said panels, so as to permit the tie-down cord 221 to pass around the inside of the legs of the chair (as is shown particularly at 222, 223, 224 and 225). This tie-down cord also may extend through the tunnel 80 at the lower edge of the back panel 29, and the free edges of the cord 221 may be tied together at the gap 82 to the rear tunnel 80. The tie-cord 221 thus holds the lower edges of the upper body portion of this form of slip-cover tightly against the sides of the chair, and constantly tensioned in a downward direction.

The tie-cord 221 may be constructed of elastic or other stretchable material, so as to afford the panels of the body portion additional stretchability when stresses are placed thereupon.

Figure 8 discloses a skirt member similar to that shown in Figure 5, but which includes only a pleated portion 226 and an elastic cord 227 associated therewith along the upper edge of the pleated portion 226. The portion 226 has no free ends (such as the free ends 95 and 98 associated with the skirt 28 referred to hereinabove). In the embodiment shown in Figure 8, the skirt 226 and the elastic 227 are continuous. Thus, the skirt 226 may be stretched along its circumference and placed around the lower edge of the chair shown in Figure 7, so that the elasticized edge 227 is at or above a level generally indicated by the edge 218 of the seat-panel 217.

With particular reference now to Figures 18 and 19, we show a further embodiment of the present invention, generally like those disclosed in Figures 1, 4, 6, 7, 8, 9 and 10, with the exception that the skirt 228 is permanently attached along the upper edge 229 to the main body portion of the slip-cover. Thus, the skirt 228 is not detachable from the body portion of the slip-cover, but on the other hand, will at all times be associated therewith. This embodiment includes, at the rear, a slide-fastener 230 (or other detachable connection), which permits one side panel 231 temporarily to be detached from the stretchable outer back-panel 29 when the slip-cover is being drawn over the back of the chair. After the slip-cover has been smoothed into place, the slide-fastener 230 may be closed so as to draw the sides, back and skirt closely about the chair (shown more fully in Figure 19). In this embodiment, a tie-down cord 232, similar to the cord 81 disclosed hereinabove, may be used to fasten the rear edge of the "breather" panel 29 closely adjacent the lower edge of the chair.

Although the embodiment shown in Figures 18 and 19 includes non-stretchable woven front arm-panels, outer arm-panels and seat-panel, it is to be understood that we may substitute stretchable knitted or "breather" panels such as those shown in Figure 7 for the corresponding woven textile panels. Similarly, we may use the tie-down cord 221, shown in Figure 7, in place of the tie-down cord 232, shown in Figure 19.

The present invention may be embodied in other specific forms without departing from the spirit or essential attributes thereof, and it is therefore, desired that the present embodiments be considered in all respects as illustrative, and not restrictive, reference being had to the appended claims rather than to the foregoing description to indicate the scope of the invention.

Having thus described our invention, we claim as new and desire to protect by Letters Patent:

1. A slip-cover for upholstered furniture having seat, arms and back, including a body portion and a skirt portion; said body portion comprising a seat panel, a front back-panel, a rear back-panel, shoulder panels, front panels, and arm panels, said front panels being attached to the forward edge of said arm panels, said seat panel being attached to the inner edges of said arm panels and to the lower edge of said front back-panel, the upper edge of said front back-panel being attached to said rear back-panel, said shoulder panels being attached to the sides of said front back-panel and to said rear back-panel, the outer portions of said arm panels being attached at the rear edge to said rear back-panel, inner portions of said arm panels being unattached to said front back-panel and said shoulder panels, said front back-panel, shoulder panels and arm panels having gaps therebetween providing juxtaposed unconnected free edges of said arm and shoulder panels which may be tucked into the spaces between the arms and the back of said piece of furniture, said skirt portion including a panel adapted to overlie the front portion of the seat of said furnture and detachably connected to said seat panel along a line spaced substantially inwardly from the front edge of said seat, said skirt adapted to extend around said furniture with one edge above the lower edge of said body portion and one edge below the lower edge of said body portion, and having free ends adjustably connected whereby to draw said skirt and the lower edge of said body portion closely adjacent said piece of furniture.

2. A slip-cover for upholstered furniture having seat, arms and back, including a body portion and a skirt portion; said body portion comprising a seat panel, a front back-panel, a stretchable rear back-panel, shoulder panels, front panels and arm encasing portions, said arm encasing portions consisting of an inner and top non-elastic woven fabric panel and an outer stretchable tensioning panel, said front panels being attached to the forward edges of said arm encasing portions, said seat panel being attached to the inner edges of said inner arm panels and to the lower edge of said front back-panel, the upper edge of said front back-panel being attached to said rear back-panel, said shoulder panels being attached to the side-edges of said front back-panel and to the edge of said rear back-panel, the stretchable outer panel of said arm encasing portions being attached at the rear edge to said rear back-panel, the non-stretchable inner panels of said arm encasing portions being unattached to said front back-panel and shoulder panels, said front back-panel, shoulder panels and arm encasing portions having gaps therebetween providing juxtaposed unconnected free edges of said arm encasing portions and shoulder panels which may be tucked into the spaces between the arms and back of said piece of furniture, said skirt portion including a panel adapted to overlie the front portion of the seat of said furniture and detachably connected to said seat panel along a line spaced substantially inwardly from the front edge of said seat, said skirt portion adapted to extend around said furniture with one edge above the lower edge of said body portion and one edge below the lower edge of said body portion.

3. A slip-cover for upholstered furniture having seat, arms and back, including a body portion and a skirt portion; said body portion comprising a knitted seat panel, a front back-panel, a rear back-panel, shoulder panels, front panels and arm panels, said front panels being attached to the forward edges of said arm panels, said knitted seat panel being attached to the inner edges of said arm panels and to the lower edge of said front back-panel, the upper edge of said front back-panel being attached to said rear back-panel, said shoulder panels being attached to the sides of said front back-panel and to said rear back-panel, the outer portions of said arm panels being attached at the rear edge to said rear back-panel, inner portions of said arm panels being unattached to said front back-panel and said shoulder panels, said front back-panel, shoulder panels and arm panels having gaps therebetween providing juxtaposed unconnected free edges of said arm and shoulder panels which may be tucked into the spaces between the arms and the back of said piece of furniture, said skirt portion including a panel adapted to overlie the front portion of the seat of said furniture and detachably connected to said knitted seat panel along a line spaced substantially inwardly from the front edge of said seat, said skirt portion adapted to extend around said furniture with one edge above the lower edge of said body portion and one edge below the lower edge of said body portion.

4. A slip-cover for upholstered furniture having seat, arms and back, including a body portion and a skirt portion; said body portion comprising a seat panel, a front back-panel, a rear back-panel, front panels and arm-encasing portions, said front panels being attached to the forward edges of said arm-encasing portions, said seat panel being attached to the inner edges of said arm-encasing portions and to the lower edge of said front back-panel, the upper edge of said front back-panel being attached to said rear back-panel, the outer panels of said arm-encasing portions being attached at the rear edge to said rear back-panel, inner panels of said arm-encasing portions being unattached to said front back-panel, said front back-panel and arm-encasing portions having gaps therebetween providing juxtaposed unconnected free edges of said arm and front back-panels which may be tucked into the spaces between the arms and back of said piece of furniture, a stretchable self-contracting tensioning strap having its ends attached to said front back-panel and passing behind the back of said furniture so as to rearwardly tension said front back-panel, said skirt portion including a panel adapted to overlie the front portion of the seat of said furniture and detachably connected to said seat panel along a line spaced substantially inwardly from the front edge of said seat, said skirt adapted to extend around said furniture with one edge above the lower edge of said body portion and one edge below the lower edge of said body portion, and having free ends adjustably connected whereby to draw said skirt and the lower edge of said body portion closely adjacent said piece of furniture.

5. A slip-cover for upholstered furniture having arms, legs, a seat and a back-rest, said slip-cover comprising a body-member and a skirt-member, said body-member being constructed and arranged to fit over the arms, seat and back-rest of said furniture, said skirt-member having a panel overlying the seat-covering portion of said body-member and being detachably connected to said seat-covering portion along a line spaced substantially inwardly from the front edge of said seat-covering portion, with its outer edge adapted to be disposed somewhat above the tops of the legs, said skirt-member including a band-panel secured to the outer edge of the first-named panel constructed and arranged to encircle said furniture with its upper edge somewhat above and outside of the lower edge of the body-portion, said skirt-member including a pleated-panel secured to the lower edge of said band-panel and adapted to encircle and at least partially to conceal the legs of said furniture, said skirt-member being provided with adjustable fastener-members adapted operatively to connect the ends of said band-panel behind the back-rest.

6. A slip-cover for upholstered furniture having arms, legs, a seat and a back-rest, said slip-cover comprising a body-member and a skirt-member, said body-member being constructed and arranged to fit over the arms, seat and back-rest of said furniture, and having a generally continuous lower edge adapted to extend around the front and sides of the furniture somewhat above the tops of the legs, said skirt-member including a band-panel constructed and arranged to encircle said furniture with its upper edge somewhat above and outside of the lower edge of the body-portion, said skirt-member including a pleated-panel secured to the lower edge of said band panel and adapted to encircle and at least partially to conceal the legs of said furniture; said skirt-member having a panel extending horizontally from the band and detachably connected to said body-member along a line spaced inwardly from the front edge of the furniture seat.

7. A ready-made slip-cover for a piece of upholstered furniture having a seat, a pair of side arms and a back, said slip-cover comprising a main body-portion having a seat-covering panel and being adapted continuously to envelop the entire outer circumference of said upholstered furniture below the tops of said arms, the outer circumference of said slip-cover being sufficiently large to accommodate furniture of varying sizes of outer circumferences within a predetermined range, a back-enveloping portion extending above the level of the arms, said back-enveloping portion being connected to said main body-portion and to the seat portion so as to envelop the back from a point above the level of the arms, the outer panels of the arm-enveloping portions being formed of generally inelastic woven fabric and being continuous with the rearmost panel of the back-enveloping portion of the slip-cover, the inner panels of the arm-enveloping portions being formed of generally inelastic woven fabric and being attached to the seat-portion but being unattached in relation to the adjacent portions of the front of the back-enveloping portion of the slip-cover also formed of generally inelastic woven fabric, thereby to form open slits between the inner panels of the arm-enveloping portions and the inner panel of the back-enveloping portion, each of said slits being completely surrounded by generally inelastic-woven-fabric portions of the slip-cover, and said outer back-panel being formed of stretchable self-contracting fabric or the like constructed and arranged to contract the outer circumference of the slip-cover around the main body of the furniture and also around the back of the furniture which projects above the arms, and a skirt-member including a band-panel constructed and arranged to encircle said furniture with its upper edge somewhat above and outside of the lower edge of the body-portion, said skirt-member having a panel extending inwardly therefrom and constructed and arranged to overlie at least part of the seat-covering panel of said body-portion.

8. A ready-made slip-cover for a piece of upholstered furniture having a seat, a pair of side arms and a back; said slip-cover comprising a main body-portion including a seat-covering panel and being adapted continuously to envelop the entire outer circumference of said upholstered furniture below the tops of said arms, the outer circumference of said slip-cover being sufficiently large to accommodate furniture of varying sizes of outer circumferences within a predetermined range, a back-enveloping portion connected to the main body-portion and extending above the level of the arms, said back-enveloping portion being made up of a front-panel, a pair of shoulder-panels and a back-panel, said front-panel and said shoulder-panels being formed of generally inelastic woven fabric and being interconnected by generally vertical cord-welted seams whereby the adjoining portions of the shoulder-panels can be tucked underneath the front-panel and held in place by the cord-welted seams, thereby to provide a snug fit for the back of the furniture, said back-panel extending from slightly below the top of the back and substantially to the bottom of the slip-cover and being formed of a stretchable self-contracting fabric or the like and serving to contract the outer circumference of the slip-cover around the main body of the furniture and also around the upwardly-extending back thereof, and a skirt-member including a band-panel constructed and arranged to encircle said furniture with its upper edge somewhat above and outside of the lower edge of the body-portion, said skirt-member having a panel extending inwardly therefrom and overlying and secured to at least part of the seat-covering panel of said body-portion.

GEORGE S. KRASNOV.
NORMAN I. KRASNOV.

References Cited in the file of this patent

UNITED STATES PATENTS

| Number | Name | Date |
|---|---|---|
| 1,942,111 | Levi | Jan. 2, 1934 |
| 2,098,684 | Fry | Nov. 9, 1937 |
| 2,100,868 | Oppenheimer | Nov. 30, 1937 |
| 2,286,171 | Krasnov et al. | June 9, 1942 |
| 2,363,271 | Sugarman | Nov. 21, 1944 |
| 2,392,051 | Lenz | Jan. 1, 1946 |
| 2,416,806 | Waranch | Mar. 4, 1947 |
| 2,469,520 | Roberts | May 10, 1949 |